Oct. 7, 1958
L. HED
2,855,562
DIRECT CURRENT PRESATURATED CURRENT
TRANSFORMER ARRANGEMENT
Filed Sept. 13, 1956
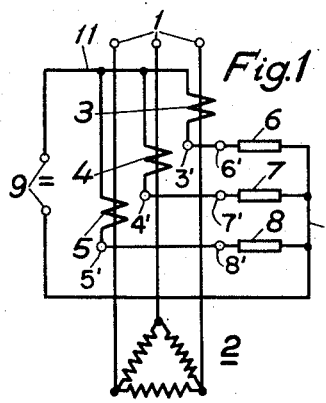
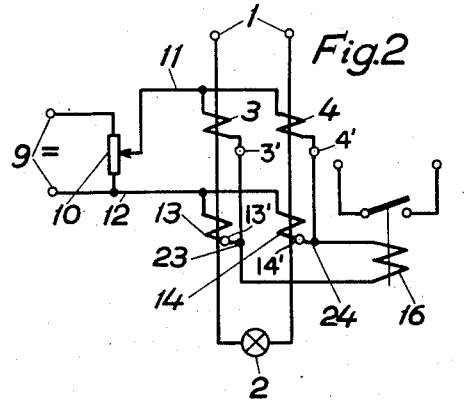
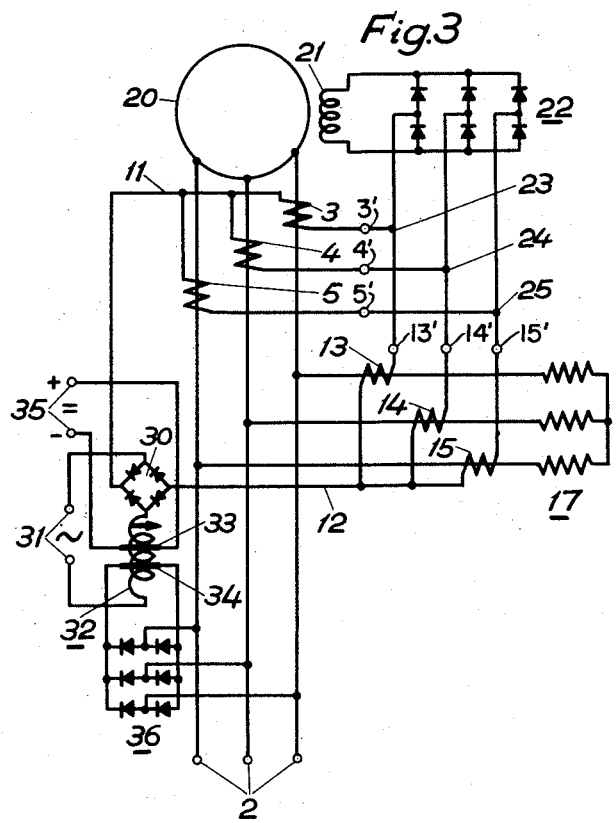
INVENTOR.
Lars Hed
BY
Attorney.

2,855,562

DIRECT CURRENT PRESATURATED CURRENT TRANSFORMER ARRANGEMENT

Lars Hed, Vasteras, Sweden, assignor to Allmänna Svenska Elektriska Aktiebolaget, Vasteras, Sweden, a corporation of Sweden Application September 13, 1956, Serial No. 609,729

Claims priority, application Sweden September 16, 1955

5 Claims. (Cl. 322—25)

This invention relates to a direct current presaturated current transformer arrangement, and more particularly to a novel arrangement for introducing direct current excitation in a group of current transformers feeding a common load.

Direct current presaturation is a useful means for controlling the secondary current from current transformers, but it was hitherto necessary to provide separate control windings for the direct current and to provide a large impedance to alternating current in series with the source of direct current in order to avoid too heavy loading of the current transformers from the direct current circuit.

It is an object of the invention to provide a direct current presaturated current transformer arrangement in which the direct current circuit constitutes no fundamental frequency load on the current transformers.

Another object of the invention is to provide a direct current presaturated current transformer arrangement in which the direct current is flowing in the same windings as the load current, so that separate control windings are obviated and the presaturation control may be applied to apparatus utilizing standard current transformers.

It is a further object of the invention to provide an arrangement for introducing direct current excitation in the current transformers of a standard means for self-excitation of synchronous generators, whereby a substantial improvement in the voltage regulation of the generator may be obtained.

According to the invention the current transformers are provided with secondary windings being connected to form a symmetrical multiphase system having a neutral point, which neutral point via a source of direct current is connected to the neutral point in a second symmetrical multiphase system connected to said secondary windings. The arrangement according to the invention is especially advantageous when the second symmetrical multiphase system is made up of secondary windings in a second group of current transformers. The two groups of current transformers need in that case not be influenced by the same primary current.

The mode of operation and some of the advantages of the invention is described below with reference to the accompanying drawing in which Figs. 1 and 2 show preferred forms of the invention, and Fig. 3 shows a preferred form of the invention utilized in an arrangement for voltage control of a self-excited synchronous generator.

In Fig. 1 the numeral 2 designates a three-phase load being connected via current transformers 3, 4 and 5 to a three-phase network having terminals 1. The secondary windings of the current transformers are arranged to form a star-connected three-phase network with a neutral point 11 and three free phase terminals 3', 4' and 5'. These free phase terminals 3', 4' and 5' are connected to the free phase terminals 6', 7' and 8' of a second three-phase star-connected network constituted by three load impedances 6, 7 and 8. This second star-connected three-phase network has a neutral point 12. The two neutral points 11 and 12 are connected to a source 9 of direct current.

Presupposed that the secondary windings in the current transformers 3, 4, 5 are so arranged that a symmetrical three-phase system is obtained and the impedances 6, 7, 8 also constitute a symmetrical three-phase system, no alternating current will pass the direct current terminals 9 if these terminals are short-circuited. The direct current source thus constitutes no load on the current transformers. If the impedances 6, 7 and 8 are able to pass direct current, a direct current will flow through the secondary windings in the current transformers 3, 4 and 5 as soon as the voltage from the source of direct current deviates from zero, and this will in turn cause a decrease in the output current from the current transformers, as is well known. It is evident that the cores of the current transformers always will be saturated, so that no alternating current is transformed from the primary to the secondary, when the ampere-turns of the direct current in the current transformers is larger than the ampere-turns of the primary alternating current. When the direct current is diminished below this limit value, the current transformers gradually begin to work as ordinary current transformers so that the output alternating current becomes a simple function of a direct current passing the neutral points 11 and 12 when the primary current is kept constant. When the current transformers are excited with direct current, the perfect symmetry is not maintained in every instant and an alternating current will in this case pass through the direct current source 9. This alternating current has, however, a higher frequency than the alternating current in the load and its amplitude varies from zero through a maximum back to zero when the direct current excitation is increased from zero to full saturation of the cores. Even when the cores are excited with direct current, the direct current source thus does not constitute any fundamental frequency load on the current transformers.

In Fig. 2 is shown how the invention may be utilized for measurement of a single phase current. A load 2 is connected to an alternating current source 1 via current transformers 3, 4, and 13, 14. The secondary windings in the current transformers 3, 4, and 13, 14 are in pairs connected to form two symmetrical two-phase, star-connected networks, one having a neutral point 11 and two free phase terminals 3' and 4', the other having a neutral point 12 and two free phase terminals 13' and 14'. The free phase terminals, 3', 4' and 13', 14' respectively, of the two star-connected networks are connected to one another at points 23 and 24. To these points 23 and 24 a load consisting of a relay coil 16 is connected. A direct voltage taken out from a potentiometer 10 connected to a direct current source 9 is connected between the two neutral points 11 and 12 in the two two-phase systems. The connection in Fig. 2 is distinguished from the connection in Fig. 1 essentially in that both of the symmetrical multiphase systems are made up of secondary windings in current transformer influenced by the same alternating current. The direct current which is taken out from the potentiometer 10 flows through the secondary windings in the transformers 3, 4 and 13, 14, but it cannot pass through the load 16 as this is connected to points which from symmetry reasons must have equal direct current potentials. The current passing the load 16 thus must be a pure symmetrical alternating current in contrast to the load current in the arangement according to Fig. 1. As mentioned, the two groups of current transformers are parallel connected and thus contribute each one part of the load current. The current transformers therefore may be made smaller than if only one of the groups should contribute the total load power. As the current transformers 3 and 14, respectively 4 and 13, have the same excitation at every instant, the cores of these transformers may be combined so that the arrangement only comprises two current transformers, each having two secondary windings.

In Fig. 3 is shown a further form of the invention and how the invention may be utilized in a means for excitation and voltage regulation of a synchronous generator. In Fig. 3 the numeral 20 designates a synchronous generator having loan terminals 2 and a field winding 21. The field winding is fed from a three-phase rectifier 22 having alternating current terminals 23, 24, 25. The rectifier 22 is fed from a known means for self-excitation comprising current transformers 3, 4, 5 influenced by the load current of the generator and current transformers 13, 14, 15, influenced by a current which is proportional to the output voltage from the generator. The secondary windings of the current transformers 3, 4, 5 are connected to form a first symmetrical, three-phase, star-connected network having a neutral point 11 and three free phase terminals 3', 4' and 5'. The secondary windings of the other groups of current transformers 13, 14, 15 are connected to form a second symmetrical, three-phase, star-connected network, having a neutral point 12 and three free phase terminals 13', 14' and 15'. The free phase terminals, 3', 4' and 5' and 13', 14', 15' respectively, of the two star-connected networks are connected to one another and to the alternating current terminals 23, 24, 25 of the rectifier 22, and the field winding of the generator thus passes a current comprising one component from the current transformers 13, 14, 15 and one load dependent component from the current transformers 3, 4, 5. It has been proved that the output voltage from an ideal generator remains independent of the magnitude and phase angle of the load when the currents influencing the current transformers 13, 14 and 15 are in quadrature to the generator voltage. This phase relationship is obtained in the arrangement according to Fig. 3 in that the current transformers 13, 14, 15 are influenced by the current through an inductive or capacitive three-phase load 17, connected to the load terminals 2 of the generator. In the arrangement shown the generator 20 thus in normal cases is self-regulating and as the field 21 is fed by current transformers, the excitation very quickly adjusts itself after load changes. This self-regulating effect is, however, unresponsive to voltage changes caused by speed changes in the generator and the regulation is uncertain when the excitation is small because of the remanence in the poles of the generator.

In order to make possible an easy adjustment of the voltage of the generator so that a satisfactory voltage regulation is obtained in every circumstance, a direct current excitation of the current transformers may be introduced. In Fig. 3 this direct current excitation is obtained by means of an arrangement according to the invention, in that the secondary windings in the two groups of current transformers 3, 4, 5 respectively 13, 14, 15 are combined to symmetrical three-phase networks having neutral points 11 and 12. The two neutral points 11 and 12 are according to Fig. 3 connected to the direct current terminals of a rectifier 30 which is fed from an alternating current source 31 in series with a transductor 32. The transductor is self-excited and provided with a control winding 33 connected to a direct current source 35 delivering a constant current to the winding 33, and a control winding 34 being connected to the load terminals 2 of the generator via a rectifier 36. The two control windings 33 and 34 are so arranged that the constant excitation in the winding 33 opposes the self-excitation of the transductor while the excitation proportional to the output voltage from the generator in the winding 34 cooperates with the self-excitation. The system is in equilibrium when the two control excitations in the transductor 32 cancel each other, and an increase in the output voltage from the generator above that value which corresponds to this equilibrium causes an increase in the transductor current and thus an increased direct current excitation in the current transformers 3, 4, 5 and 13, 14, 15. This in turn causes a decrease in the alternating current fed to the rectifier 22, whereby the excitation of the generator 20 is decreased so that the output voltage of the generator decreases until the equilibrium is reached again.

The arrangement utilized for the direct current excitation in the current transformer groups 3, 4, 5 and 13, 14, 15 is equivalent to the arrangement shown in Fig. 2, except that the arrangement is three-phase in Fig. 3 and that the two groups of current transformers are influenced by different primary currents. The three load terminals 23, 24, 25 of the secondary windings are, however, even in Fig. 3 of equal direct current potential, and no direct current component therefore can exist in the current fed to the rectifier 22. In spite of the apparent asymmetry caused by the fact that the two groups of current transformers are influenced by different primary currents, the alternating current fed into the rectifier 22 therefore becomes symmetrical, which is an especially advantageous property in this arrangement, as the rectifier 22 must be made larger if the alternating current is asymmetric.

As will be seen from the Fig. 3 the substantial part of the arrangement is apparatus which normally is utilized in excitation means for self-excited generators. Through application of the invention it has thus been possible to obtain a very satisfactory voltage regulation, which is effective against every disturbance existing, with only that very insignificant increase in the complication of the regulator which the transductor with appurtenant rectifier involves. It has been found that the most advantageous regulation is obtained when the system is so dimensioned that the largest direct current excitation is introduced when the generator has no load. This means that the current transformers 3, 4, 5 may be dimensioned thermally only for the load current and thus does not become larger than in an arrangement which is not provided with direct current excited transformers. The arrangement according to Fig. 3 has the same suitable dynamical properties as the known connection without direct current excitation, because the time delay in the transductor 22 only is of importance for the extra adjustment required because of the imperfections of the known arrangement.

I claim as my invention:

1. A direct current presaturated current transformer arrangement, comprising a number of current transformers having secondary windings, said secondary windings being inter-connected to form a first symmetrical multiphase star-connected network having a neutral point and free phase terminals, each of said secondary windings constituting one phase in said first star-connected network, a second symmetrical multiphase star-connected network having a neutral point and free phase terminals, said free phase terminals of said first star-connected network being connected to said free phase terminals of said second star-connected network, and a direct current source connected between said neutral point of said first star-connected network and said neutral point of said second star-connected network.

2. A direct current presaturated current transformer arrangement, comprising a first number of current transfomers having secondary windings inter-connected to form a first symmetrical multi-phase star-connected network having a neutral point and free phase terminals, each secondary winding constituting one phase of said first star-connected network, a second number of current transformers having secondary windings interconnected to form a second symmetrical multi-phase star-connected network having a neutral point and free phase terminals, each secondary winding constituting one phase of said second star-connected network, said free phase terminals of said first star-connected network being connected to said free phase terminals of said star-connected network, and a direct current source connected between said neutral point of said first star-connected network and said neutral point of said second star-connected network.

3. A direct current presaturated current transformer arrangement, comprising a first number of current transformers having primary and secondary windings, said secondary windings being interconnected to form a first symmetrical multi-phase star-connected network having a neutral point and free phase terminals, each secondary winding constituting one phase of said first star-connected network, a second number of current transformers having primary and secondary windings, said secondary windings being interconnected to form a second symmetrical multi-phase star-connected network having a neutral point and free phase terminals, each secondary winding constituting one phase of said second star-connected network, said free phase terminals of said first star-connected network being connected to said free phase terminals of said second star-connected network, a direct current source connected between said neutral point of said first star-connected network and said neutral point of said second star-connected network, and a load connected to said free phase terminals of said first and said second star-connected networks.

4. An arrangement according to claim 3, in which said load is a rectifier feeding a field winding in a synchronous generator having output terminals, a working load being connected to said output terminals in series with said primary windings in said first number of current transformers, a reactive secondary load being connected to said output terminals in series with said primary windings in said second number of current transformers.

5. An arrangement according to claim 4, in which said source of direct current is controllable, and having means responsive to deviations from a predetermined value in a voltage existing between said output terminals controlling said direct current source.

References Cited in the file of this patent

UNITED STATES PATENTS

| | | |
|---|---|---|
| 2,075,105 | Evans | Mar. 30, 1937 |
| 2,454,582 | Thompson et al. | Nov. 23, 1948 |
| 2,569,302 | Forssell | Sept. 25, 1951 |